Aug. 4, 1959     G. J. JONOVICH     2,897,563
AIRCRAFT CABLE CLAMPS
Filed July 21, 1958

INVENTOR.
George J. Jonovich
BY Scott L. Nowell
atty

2,897,563
AIRCRAFT CABLE CLAMPS

George J. Jonovich, Phoenix, Ariz.

Application July 21, 1958, Serial No. 749,773

4 Claims. (Cl. 24—126)

This invention concerns improvements in an aircraft cable clamp.

One of the objects of the invention is to provide a cable clamp which can be made in small sizes and of light material but will adequately hold and clamp cables used in aircraft for controls of all types and for general utility purposes in connection with flexible steel wire cables;

Another object of the invention is to provide a cable clamp of the type wherein the parts may be set in position manually and temporarily set by a convenient hand tool and will thereafter be maintained in clamped position by tension of the cables;

Still another object is to provide a cable clamp consisting of a minimum number of parts which can be made interchangeable by mass production methods and which may be assembled on the job with a minimum of manual labor;

Still another object is to provide a cable clamp consisting of an outer cylindrical shell through which the cables to be clamped are placed and then set in tight clamping position by means of wedges which extend into the shell from each end and tighten as they are advanced from each end of the shell, respectively.

Further objects will appear hereinafter.

I attain the foregoing objects by means of the devices, parts, and combinations of parts shown in the accompanying drawings, in which—

Similar numerals refer to similar parts in the several views.

The outer shell 2 which constitutes the body of the clamp is a true cylinder and is made of light metal having sufficient strength to stand the strains to which the clamp, in each instance, is to be put. The outer surface 3 of this body, is cylindrical, the walls are of uniform thickness and the interior 4 is circular and the inner walls are smoothly finished.

Figure 2:
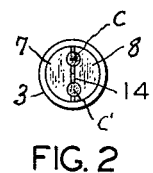
Figure 2 is an end view of the device as shown in Figure 1.

Within this shell, or body, there are two semi-circular wedges 7 and 8. The outer surfaces 9 of each of these wedges are substantially semi-circular. The inner faces 12 and 12' are flat. The body of each of the wedges 7 and 8 is sized and dimensioned so that the inner faces 12 do not meet in a diametrical center line within the body 2 but a space is provided between the inner faces as indicated by numeral 14, Figure 2.

Each of the wedges is made in the same manner. On one side of the center line of the face 12 of each wedge there is a tapered groove 15 which has diagonal arcuate grooves or furrows 16. These grooves are spaced, curved, and cut out to match and register with the twist of the strands of the cable intended to be gripped. The side edges 17 and 18 of the groove are tapered from the end marked B toward the end of the wedge marked A. The depth of the groove is not a full semi-circle at the butt end B but is somewhat less than a semi-circle and the depth also tapers from end B to end A. The depth of the groove at its largest end, B, will provide a portion of a semi-circular groove which, when matched with an opposite groove, hereafter described, will enclose the cable C to be gripped.

On the opposite side of face 12 there is a second groove 20 which is symmetrically positioned relative to the longitudinal center line of the wedge and has side edges 21 and 22 which converge from end B toward end A of the wedge. The depth of this semi-circular groove also varies so that its depth lessens from end B toward end A. The walls of groove 20 are smooth.

Figure 4:
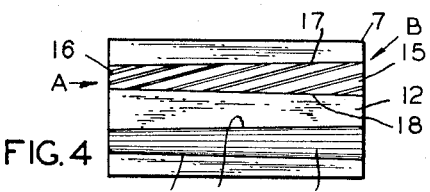
Figure 4 is a plan view of the inner face of one of the cable wedges.
Figure 5:
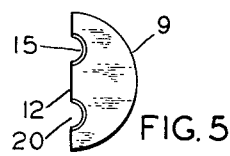
Figure 5 is an end view thereof.
Figure 6:
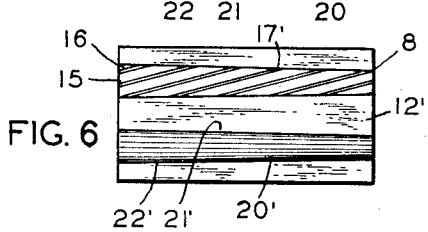
Figure 6 is a plan view of a cable used opposite the wedge shown in Figure 4.
Figure 7:
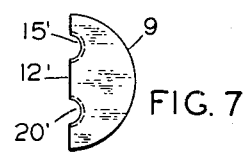
Figure 7 is an end view of the wedge shown in Figure 6.
Figure 8:
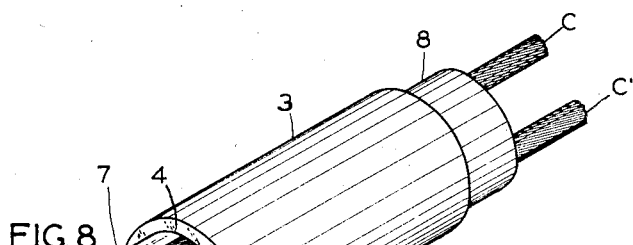
Figure 8 is a perspective view of the cable clamp as it appears in use and drawn on an enlarged scale.

While wedges 7 and 8 are made the same, they are placed within the body 2 so that wedge 8 is turned end for end relative to wedge 7 and they are both inserted from opposite ends of case 2. When the wedges are turned end for end and positioned as shown in Figures 4 and 6 and then brought together with their faces in adjacent position, it will be noted that the groove 17 in wedge 7 is in complementary position to the grooved wall groove 17' of wedge 8.

Figure 3:
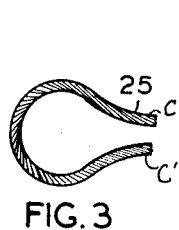
Figure 3 is a side elevational view of a cable loop which may be used in connection with the clamp shown in Figure 1.

As a result of this construction, a cable C placed in grooves 17 and 20' will tend to tighten when it is pulled in the direction of arrow D. This is due to the fact that motion of the cable will slide in the groove 20' and will tend to draw the grooved groove 17 in the direction of the pull. At the same time if cable C' is pulled in the direction of arrow D' the same tightening action takes place but in the direction of the arrow as indicated. Thus, if cables C and C' be extended in the direction of Figure 3, a loop of the cable, marked 25, may be maintained and if cable C takes the strain of the load then cable C' will take the strain necessary to maintain the loop. As a result the clamp here shown will maintain its locked position on both cables which lead to and from the loop 25.

Figure 1:
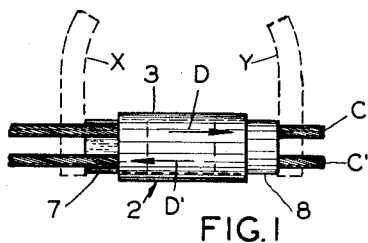
Figure 1 is a side elevational view of a preferred form of this clamp with the cables and wedges in place in the shell but not drawn up to final holding position.

In setting up the clamp the cable to be used is run through the shell or body 2. The wedges 7 and 8 are inserted at their respective ends of the shell with the grooves set to tighten in the proper direction, as above explained. After the cable has been adjusted properly as to length and the wedges are set tight enough to hold at the position desired they are next clamped by the jaws X and Y, shown in dotted lines in Figure 1. These are jaws of a hand clamp and the pressure exerted on the ends of the wedges is sufficient to force them into locked position. That is, into the shell to a point where the wedge grooves tend to bite into the body of the cables. This manual setting pressure is sufficient to maintain the clamp in position. Any further tightening of the cable by strain applied in the directions of the arrows D and D', Figure 1, will tend to further tighten the wedges. This is due to the fact that the outer faces 9 of the wedges slide freely on the inner face of the shell 3 and that the inner faces 12 of the wedges are not in contact and that each wedge will move in the direction of the taper of the grooved groove on its face, whereas the cable will slide on the opposite side of the groove formed by the smooth wall grooves 20 and 20', respectively.

Figure 9:
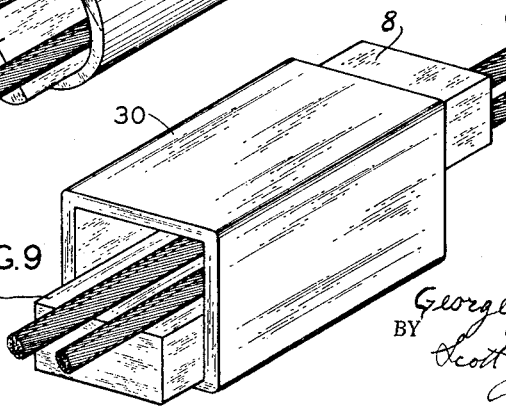
Figure 9 is a perspective view of a modified form of cable clamp as it appears in use and drawn on a similar scale to Figure 8.

In the modified form shown in Figure 9 the case 30 is square rather than cylindrical. Accordingly the wedges 7 and 8 are rectangular in section to fit into and slide easily in the interior of the case. The cables C and C' are held in a similar manner to that above explained.

It will be easily understood that in all forms, irrespective of the section of case or body, the clamp, as a whole, is intended to join and hold cables in which the tension is in opposite directions. The body 2 floats and does not not hold any tension one way or the other. Its purpose is merely to provide a container and holder for the wedges. The wedges slide into the case from opposite directions and each wedge as it enters the case sets up a clamping pressure on one of the cables. The overall effect is that as one cable pulls away from the case it tends to tighten one wedge and at the same time the opposite cable pulls in the opposite direction and tends to tighten the opposite wedge accordingly. The tightening takeup occurs between the opposite grooves on the opposite faces of the wedges.

I claim:

1. A clamp for joining cables consisting of an outer shell having an opening of uniform sectional size throughout its length, a pair of cable clamping wedges operating within said shell and having outer surfaces conforming to the interior of said shell, and inwardly positioned faces aligned with the longitudinal center of said shell, said inwardly positioned faces of said wedges each having grooves on each side of center, the cross-sectional shape of said grooves defining a portion of a circular arc; one of the said grooves on the face of each of said wedges having a smooth surface and tapering in depth and width in one direction and the surfaces of the other groove being formed with arcuate slanting furrows adapted to mate with the outer surface of a cable to be clamped; said wedges being placed within said shell so that each of the said grooves in the faces of opposite wedges form channels to receive cables to be clamped; one half of each channel conforming to the surface of a cable and adapted to move with the cable when under tension, and the other half of said channel being smooth and adapted to slide relative to said cable; each of said grooves forming channels on each side of said pair of wedges with the direction of taper reversed relative to the channel on the other side of said wedge faces whereby tension in opposite directions on said cables will draw said wedges into said outer shell and tighten the cables in the grooves forming said channels in said wedges.

2. A clamp for joining two cables made of twisted steel strands consisting of an outer shell having a longitudinal opening of uniform sectional size, and a pair of similar cable clamping wedges within said shell, each occupying substantially half the space within the shell and having an outer surface conforming with the inner surface of the longitudinal opening in said shell and an inner flat surface having arcuate grooves on each side of the center to receive and grip a part of the outer surface of each of said cables, said grooves tapering in depth and width from end to end of the wedge with the taper of the two grooves converging toward opposite ends of the inner face of each wedge; the surfaces of one of said grooves being smooth and the surfaces of the other groove being formed with arcuate slanting furrows adapted to conform to the twist of the strands of the cable; said wedges being disposed in said shell with the grooves of said wedges on each side of center in mating position and adapted to mutually grip each of said cables between the smooth groove of one wedge and the furrowed groove of the opposite wedge; the tapers of said grooves being disposed in opposite directions so that each of said cables tends to tighten the wedges gripping its surface when it is placed under tension by drawing them into said shell; the groove with the arcuate slanting furrows on its face moving with the cable gripped by it and the opposite smooth faced groove sliding on the said cable as the tightening proceeds.

3. A clamp for joining the end portions of cables made of twisted strands consisting of an outer shell having a longitudinal opening of uniform diameter throughout its length, and a pair of cable clamping wedges operating within said shell, each of said wedges having outer surfaces conforming to the inner face of said shell, and rectangular inner faces adapted to face each other within said shell leaving a gap to provide space between said faces to receive the end portions of cables to be joined; said inner wedge faces having parallel grooves on each side of the longitudinal center of said inner face; said grooves having rounded bottoms tapering from opposite ends of said wedges, and being substantially semi-circular at the end of greatest depth and tapering in depth and width toward the opposite end; the surfaces of one of said grooves on each wedge being smooth and the surface of the other groove having arcuate slanting furrows conforming to the outer surface of the stranded twisted cable to be clamped; said wedges being allochirally shaped and disposed in said shell in reversed end for end relation with their inner faces adjacently positioned so that opposite grooves form parallel cable clamping channels.

4. A clamp for joining the end portions of cables made of twisted strands consisting of an outer shell having a longitudinal opening of uniform diameter throughout its length, and a pair of cable clamping wedges operating within said shell, each of said wedges having outer surfaces conforming to the inner face of said shell, and rectangular inner faces adapted to face each other within said shell leaving a gap to provide space between said faces to receive the end portions of cables to be joined; said inner wedge faces having parallel grooves on each side of the longitudinal center of said inner face; said grooves having rounded bottoms tapering from opposite ends of said wedges, and being substantially semi-circular at the end of greatest depth and tapering in depth and width toward the opposite end; the surfaces of one of said grooves on each wedge being smooth and the surface of the other groove having arcuate slanting furrows conforming to the outer surface of the stranded twisted cable to be clamped; said wedges being allochiral and disposed in each end of said shell in reversed end for end mutual relation so that channels are provided on each side of said pair of wedges; each of said channels having a longitudinal groove with arcuate slanting furrows on its surface, adapted to grip the cable in said channel, and a groove with a smooth face, adapted to slide relative to said cable, as said wedges move into said sleeve for tightening.

References Cited in the file of this patent

UNITED STATES PATENTS

| | | |
|---|---|---|
| 2,204,979 | Buchanan | June 18, 1940 |
| 2,458,304 | Runde | Jan. 4, 1949 |

FOREIGN PATENTS

| | | |
|---|---|---|
| 475,664 | France | Mar. 15, 1915 |